POLYETHLENE (WAVELENGTH IN MICRONS)

SMOOTH AND HARD FILM OF A DRYING OIL MODIFIED ALKYD VEHICLE COMPRISING NITROCELLULOSE (WAVELENGTH IN MICRONS)

PARTLY UNCURED FILM OF A DRYING OIL MODIFIED ALKYD VEHICLE COMPRISING NITROCELLULOSE (WAVELENGTH IN MICRONS)

Noel B. Proctor
INVENTOR.

BY Arnold and Roylance

ATTORNEYS

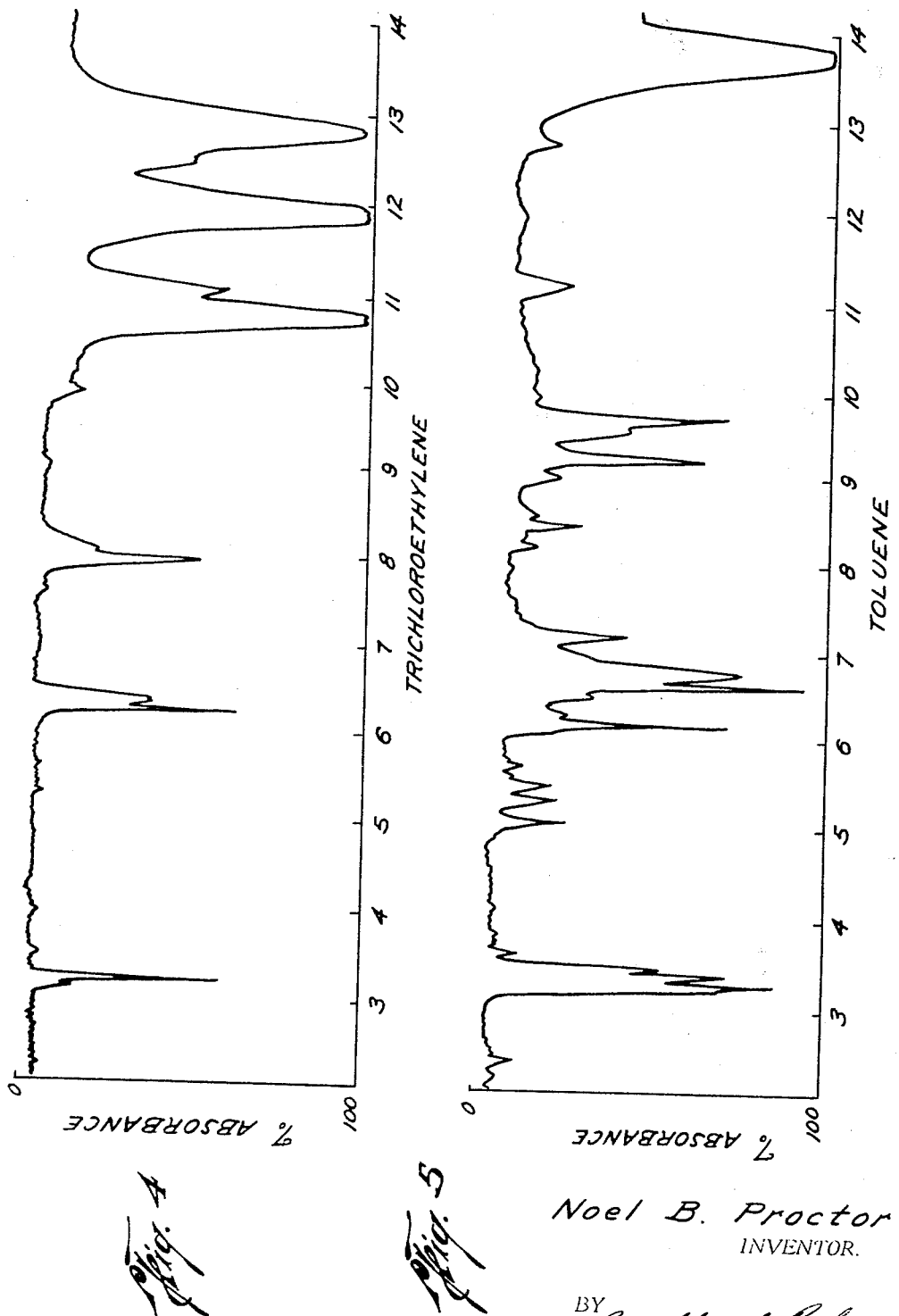

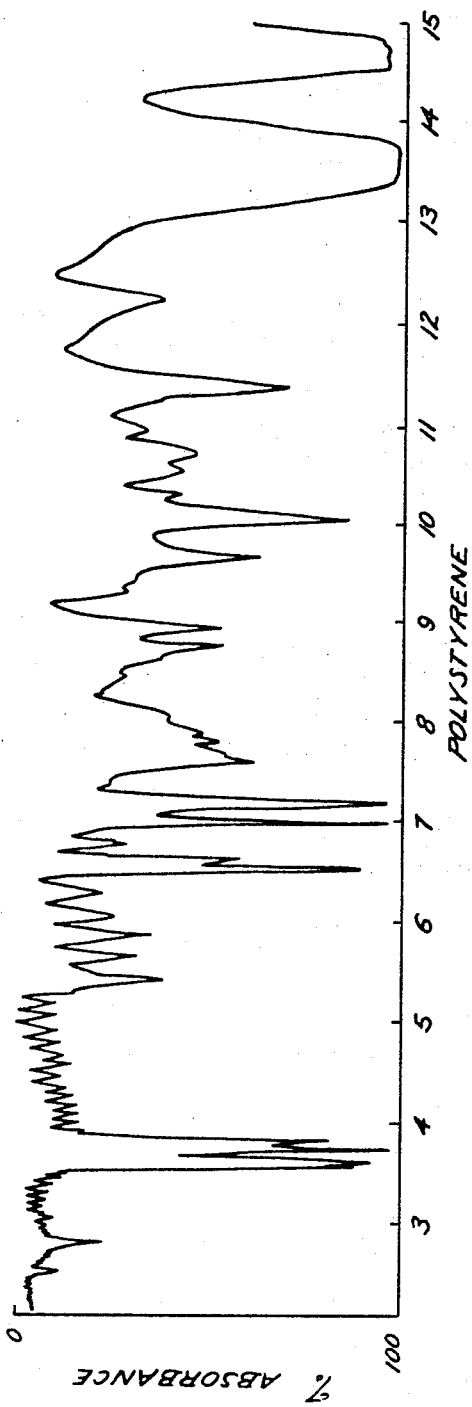

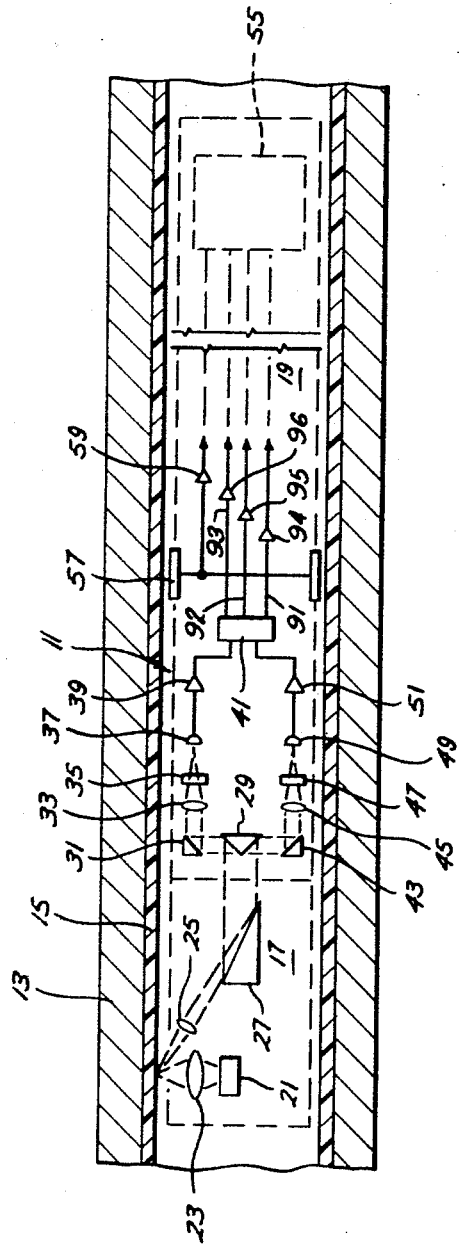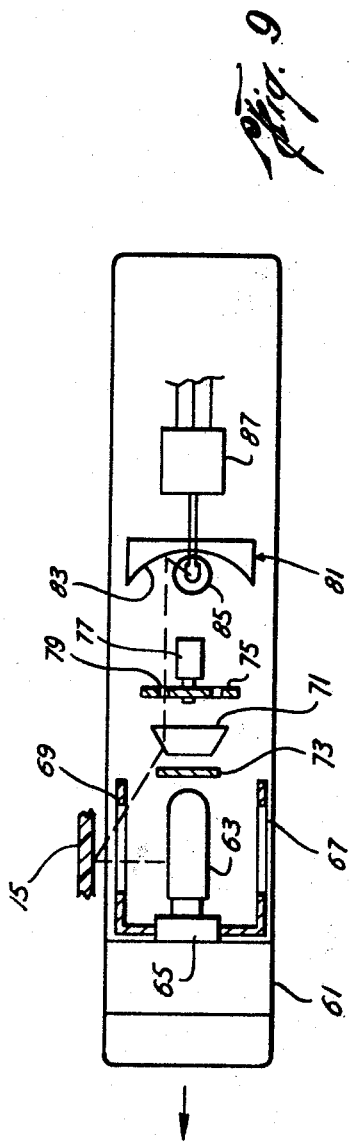

United States Patent Office 3,448,268
Patented June 3, 1969

3,448,268
COATING INSPECTION METHOD AND APPARATUS USING INFRARED RADIATION
Noel B. Proctor, Houston, Tex., assignor to American Machine & Foundry Company, New York, N.Y., a corporation of New Jersey
Filed Feb. 10, 1966, Ser. No. 526,501
Int. Cl. G01t 1/16
U.S. Cl. 250—83.3      14 Claims

ABSTRACT OF THE DISCLOSURE

Inspection of polymer coatings for properties of curing, bonding or thickness, by directing infrared radiation at the coating and detecting the reflection from the underlying abstrate. The frequencies reflected or absorbed in the coating provide indicia of the properties of interest.

---

This invention relates to a method and apparatus for inspecting a polymer coating applied to a substrate and more particularly to a method and apparatus for using infrared energy for inspecting such a coating for proper curing, proper bonding and/or proper thickness.

The ever-expanding recognition of the advantage of using inert organic coatings to prevent or control corrosion of metallic substrates, such as through the application of such coatings to the interior and sometimes to the exterior of tubular goods, has necessitated improved methods and apparatuses for detecting monolithic anomalies that might happen in such coatings.

A device capable of early detection of improper curing (lack of polymerization), delamination and/or improper thickness of polymer-coated surfaces potentially can greatly prolong the useful life of coated workpieces. The available flaw or holiday detecting devices used for inspecting such surfaces are not satisfactory for such inspection. In fact, some high voltage, spark-type testers, such as described in Tinker 2,615,077, cause many defects in sound coating by punching or burning holes in the coating because of improper use or because to too much power being dissipated in the inspected area.

It is known that every properly bonded and cured coating substance has a distinct and unique spectrograph, sometimes referred to as its "finger-print." From the infrared spectrograph range for a given polymer coating material, it may be observed that at certain, rather narrow bands of frequencies the coating absorbs a high percentage of energy. This means that very little of the energy projected or radiated at the material in these narrow bands of frequencies, otherwise known as "opaque frequencies," pass through the material. Should the coating material not be properly cured or should the material not be properly bonded, the spectrograph trace at these opaque frequencies is not the same for a properly cured and bonded coating.

Similarly, other conditions of the material which vary from normal, such as variations in thickness, also have varying altering effects on the developed spectrograph.

The invention described herein utilizes the fact that the spectrograph for a coating material which is not monolithic in nature differs from the spectrograph for a normal monolithic material and further, that the various conditions that cause a material not to be monolithic each has a predictably determinable different effect on the spectrograph for the coating. According to the invention, an infrared source at a controlled or predetermined energy level is focused upon a small area of the coating. A detection system comprising optical and electronic components receives, directs and filters the reflected or emanating infrared energy from the material, eventually converting a narrow band or region of the received spectrum to electrical energy. This band may be selected to be an opaque frequency band or any other band of frequencies which is known to be subject to variation when the material is abnormal because of a particular monolithic anomaly. The electrical energy level of the band when metered is an indication of satisfactory or unsatisfactory condition of the monolithic character of the material.

As is more fully explained below, by monitoring one part of the frequency spectrum, information is obtained which is essentially limited to a particular type of anomaly or fault whereas by monitoring another part of the frequency spectrum information is obtained which pertains to another type of anomaly. Therefore, in some embodiments of the invention, spectrum separators and detectors are employed so as to obtain simultaneous indication of more than one condition of the material for only one source scanning operation.

It has also been discovered that by monitoring two different parts of the received spectrum and comparing the energy level therebetween, certain ambiguities are avoided and metering of certain conditions is simplified. Therefore, some embodiments of the invention include comparator means so that such measurements may be made.

Therefore, one general object of the present invention is to provide an improved method of inspecting polymer material for monolithic qualities based upon infrared spectrography.

Another general object of the present invention is to provide an improved apparatus for inspecting polymer material for monolithic qualities based upon infrared spectrography.

Yet another object of the present invention is to provide an improved infrared inspection apparatus capable of inspecting a polymer coating applied to a metallic substrate for proper curing.

Still another object of the present invention is to provide an improved infrared inspection apparatus capable of inspecting a polymer coating applied to a metallic substrate for proper bonding.

Yet another object of the present invention is to provide an improved infrared inspection apparatus capable of inspecting a polymer coating applied to a metallic substrate for proper thickness.

Still another object of the present invention is to provide an improved non-destructive, infrared inspection apparatus capable of inspecting a polymer coating applied to a metallic substrate for more than one type of proper monolithic quality, such as proper curing, proper bonding, and proper thickness.

In order that the manner in which these and other objects that will be readily apparent are attained in accordance with the invention can be understood in detail, reference is had to the accompanying drawings which form a part of this specification. It is to be noted, however, that these drawings illustrate only typical embodimens of the invention and therefore are not to be considered limiting of its scope, for the invention may admit to other equally effective embodiments.

In the drawings:

FIG. 4 is a spectrograph trace for trichloroethylene.

FIG. 5 is a spectrograph trace for toluene.

FIG. 6 is a spectrograph trace for polystyrene.

FIG. 7 is a chemical bonding diagram for a typical hypothetical material that may be inspected by the invention.

FIG. 8 is a block diagram of one embodiment of the invention.

FIG. 9 is a partial plan view of a portion of an embodiment of the invention.

The infrared spectrum is not a closely defined range of frequencies, but is generally though of as those frequencies having wavelengths between 1 micron and 300 microns (wave numbers of 10,000 and 33 cm.$^{-1}$). In the electromagnetic spectrum, the infrared frequencies are higher in frequency (shorter in wavelength) than the microwave frequencies and lower in frequency than the visible, ultraviolet and X-ray spectrums.

Although spectrographs could be developed for frequencies including the entire range so as to include microwaves at the one end and X-ray waves at the other, the only meaningful and useful range for inspection purposes in accordance with the invention described herein is the infrared range. This is principally because at the microwave frequencies, just below the infrared range, the molecular bonds are not sufficiently resonantly excited or vibrated to cause a response from internal molecular bonds capable of detection. X-ray waves and ultraviolet waves likewise cause insufficient response from the molecular bonds within plastic polymers (or even metallic-chemical bonds) in that they are too high in energy content for such interrogating. Atomic structures respond to such wave interrogation, but not polymer molecular structures. It should be mentioned that, to a lesser extent, for mos plastics even waves in the visible spectrum and infrared waves in he upper part of the infrared spectrum are subject to this same criticism (too high in frequency and energy level to cause significant response from intramolecular bonds in polymer materials).

Figure 1:
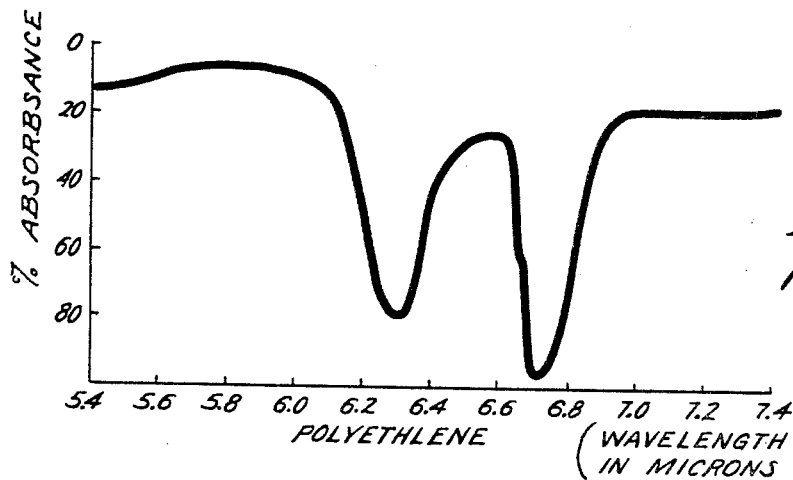
FIG. 1 is a simplified spectrograph trace for a portion of the infrared frequency spectrum for polyethylene.

Referring to the drawings and first to FIG. 1, a graph is shown of the spectrograph for a portion of the relevant infrared spectrum for a typical polymer, in this case polyethylene. The spectrograph shown in FIG. 1 and the other illustrated spectrographs are developed for coatings of uniform thickness so that any variations therein are determined solely by the absorbing conditions of the material at different frequencies and not because of any variations in thickness.

At wave lengths in the region of about 6.3 microns and again in the region of about 6.7 microns properly cured and bonded polyethylene is strongly absorbing. As used herein, if the material is strongly absorbing in a given region of frequencies, those frequencies are said to be opaque for the material. To be opaque, as the term is used herein, the spectrograph for a band of frequencies does not have to necessarily indicate a large percentage of absorption, but only an appreciably larger percentage of absorption than for the frequencies on either side thereof. On the other hand, if the spectrograph for a band of frequencies shows that an appreciably larger percentage of energy is passing through a coating material so as to be reflected from the substrate to which the coating is applied than for the frequencies on either side thereof, the band of frequencies is said to be transparent for the coating material. Those frequencies which are either opaque nor transparent for the material are therefore translucent.

Notice that not only is it known from the spectrograph that polyethylene is absorbant at predetermined frequencies, but it is known by how much. For instance, at 6.3 microns approximately 80 percent of all infrared energy directed at the material is absorbed, meaning that about 20 percent passes through.

If the spectrograph is developed for polyethylene that shows absorbance still predominating for these regions or bands of frequencies, but at values materially less than these normal percentages, then the polyethylene is not properly cured or polymerized.

Figure 2:
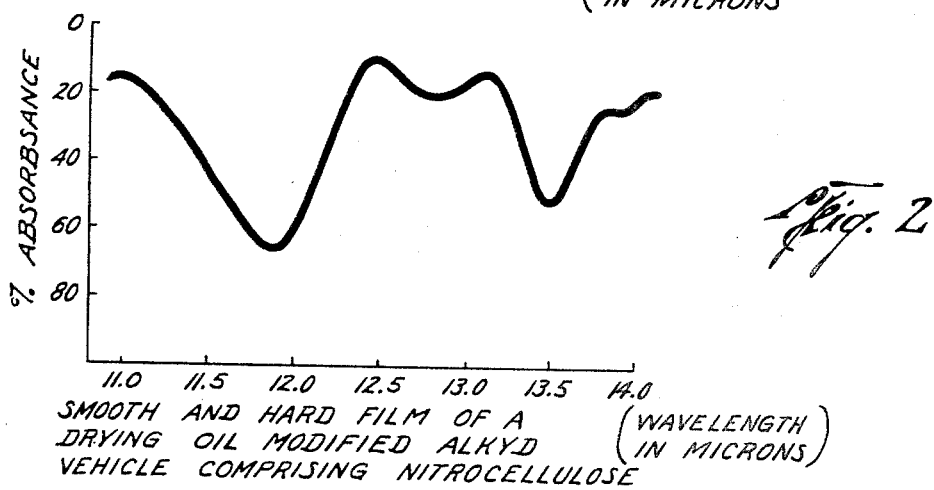
FIG. 2 is a simplified spectrograph trace for a portion of the infrared frequency spectrum for a smooth and hard film of a drying oil modified alkyd vehicle comprising nitrocellulose.
Figure 3:
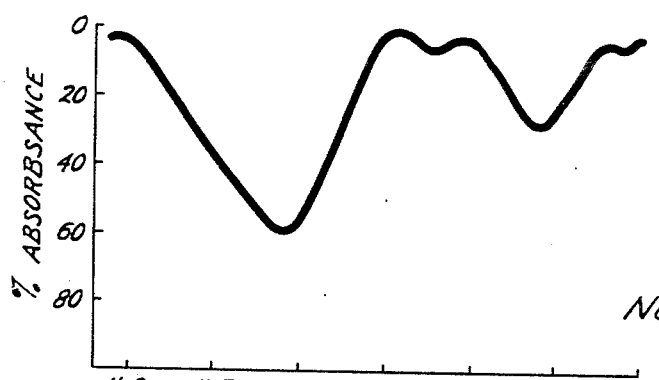
FIG. 3 is a simplified spectrograph trace for the same portion of the infrared frequency spectrum as shown in FIG. 2 for a partly uncured film of the drying oil modified alkyd vehicle comprising nitrocellulose.

Now refer to FIGS. 2 and 3 for a showing of the effects of improper curing on the spectrograph for another material. A smooth and hard film of a drying oil modified alkyd vehicle comprising nitrocellulose has a spectrograph in the 11-to-14 micron region as shown in FIG. 2. At 11.9 and 13.4 microns, there are maximum peaks of absorbance (minimum peaks transmittance). The percentage of absorbance at 11.9 microns is approximately 66 percent and the percentage at 13.4 microns is approximately 60 percent.

FIG. 3, on the other hand, shows a similar substance partly uncured. It should be noted that the percentage peaks for the predominate absorbance frequencies in this spectrum are now 60 percent (for 11.9 microns) and 28 percent (for 13.4 microns). A tuned detection system responsive to a frequency of 11.9 or 13.4 microns would detect the deviation from the normal for the smooth and hard film. Since, as is explained later, other types of monolithic anomalies also affect the spectrograph for a material, tuned detectors at both of these frequencies would assist is resolving ambiguities.

If it is desired to obtain a single unambiguous indication of proper curing, a comparison circuit may be employed in addition to two detectors tuned to two predominate absorbance frequencies. When the ratio between the two monitored regions of frequencies indicates the value for the cured material, this is an indication of proper curing. When the ratio value is a value other than the value for the cured material, then the material is improperly cured.

To accentuate the significance of the meaning of the ratio, one frequency may be selected for which the absorbance percentage value is not greatly affected by curing (or, if possible, affected oppositely from the normal manner described above), whereas the other frequency selected may be quite sensitive in the conventional manner.

To further resolve doubts of ambiguities as to cause of effects on a developed spectrograph which is not normal when two frequencies are being monitored, it is always possible to indicate deviations in the absolute percentage of absorption for one or both monitored regions, in addition to indicating the ratio comparison output.

As noted, at the more opaque frequencies in the infrared spectrum, improper curing normally causes less absorption or more transmittance than for a properly cured material. However, it should be noted that improper curing of the material affects the more transparent frequencies as well. For example, for the cured material shown in FIG. 2, at 12.5 microns the percentage of absorption is approximately 10 percent, but at the same frequency for the partly cured material the percentage of absorption is practically reduced to zero.

There are two drawbacks that normally make monitoring transparent frequencies inferior to monitoring opaque frequencies, however. First, they are not normally as subject to as wide a deviation in percentage absorption as are the opaque frequencies. Second, the peaks are normally broader in the region of the transparent frequencies, making it a bit harder to detect when something other than improper curing is having an effect on the material's spectograph especially when these broad peaks are near full scale of the spectrograph. These broader based and/or full-scale peaks should be avoided as not being as sensitive to changing conditions in the materials as the narrower peaks. For instance, this may be graphically illustrated by observing the diagram for polystyrene at a wave length of 13.5 microns.

Spectrographs for various additional polymer materials are shown in FIGS. 4, 5 and 6, viz., trichloroethylene, toluene, and polystyrene, respectively. It may be noted that at selected frequencies in each of the spectrums, there are several places where the absorption peak is quite pronounced. It may be further noted that a particular bond within the polymer has a strong influence over any particular peak, so that there is some correlation from diagram to diagram as to where some of the peaks occur. That is, when there is a peak in the diagrams for two materials at the same frequency it is probably because there is a similar bond in each of the two materials.

Heretofore, the discussion has been about detecting the degree of polymerization (curing) of a polymer plastic by observing the effects on the infrared spectrum therefor. In addition to intramolecular bonds within a polymer, there are other bonds that also have an overall effect on the infrared spectrum analysis. For instance, there is the influence of the presence of the solvent or vehicle used with the particular plastic. Any particular solvent may greatly effect a particular peak in the spectrum. Ordinarily, a solvent is no longer present (or present only in very small quantity) after polymerization. If it is known which particular peak in the spectrograph is influenced by the solvent, then by monitoring this peak it is readily determined when the solvent has been reduced during polymerization to the level it should be in the cured material.

In addition to the intramolecular bonding of the single polymer material and of any solvents that may be present, there are at least two other types of bonding that influence the spectrograph of a material in any particular application. One is the intermolecular bonding between two polymers. For instance, the hypothetical material diagrammed in FIG. 7 may comprise a long-chain polymer 1 and another long-chain polymer 3. Intramolecular bonds are those such as shown at bond 5. Intermolecular bonding is shown, for example, at bond 7 between the two molecules. This type of bonding causes a lattice-type structure in the coating material. It should be noted that each bond, whether intra- or inter-molecular causes an infrared frequency response.

It should be noted, that when a polymer material is improperly cured, the practical effect is that the chains that are normally long therein are broken and become shorter. Both undercuring and overcuring has an effect of producing shorter chains in the material than exist in a properly cured material. (Although, it should be noted that when a material is undercured the breaks in the chain occur with different bonds than when the material is overcured.) This difference in chain bonding is what effectively modifies the size of the peaks in the material spectrograph, thereby providing a means for detecting a state of improper curing.

The other non-intra-molecular bond may be identified as the bond between the polymer and the metallic substrate, such as bond 9, otherwise known as an organo-metallic bond. This bond, too, has a naturally resonant frequency in the infrared region, but normally higher in frequency than the other bonds discussed.

The organo-metallic bonds respond differently to infrared illumination than do the bonds within a polymer. Infrared is absorbed depending on the structure of polymer and the state of cure, but the application of infrared energy does not to any material extent have a direct effect on the polymerization process. Infrared actually enters slightly into the reaction of an improper organo-metallic bond, however. If there is delamination (separation or breakage) of this bond, then there is a slight amount of heating or excitation that occurs, resulting in a shift of the developed spectograph. This slight amount of heating that is detectable through spectrography is not so great as to imply that there is any actual change in the material caused by the infrared illumination, however. In addition, the movement during the scanning of the inspected coating by the illumination source during operation keeps the source from heating any particular area for a period of time that might injure the coating or otherwise cause a reaction. There is a tendency for the infrared illumination to enter into the polymerization process, but there is no actual entering therein. Therefore, no harm comes to the coating by such an inspection method.

As an example of how this shifting may occur, assume that the peak at 6.7 microns in FIG. 1 is representative of an organo-metallic bond. If the bond is proper, the spectrograph for the material is as shown. However, if the bond is delaminated, the spectrograph would be identical in other respects, but this organo-metallic bond would cause the peak to be ordinarily at some lower frequency. (For a particular bond in a particular material, the shift could be in the opposite direction as determined by viewing effects on the spectrograph. But ordinarily the shift is to a lower frequency.) The amplitude of the absorbance percentage might also be affected, but the important feature that distinguishes such a monolithic anomaly from improper curing is the shift in a peak in the spectrograph.

A satisfactory method of detecting when there is a delamination is achieved by monitoring a responsive frequency of the normal organo-metallic bond for variation in amplitude. A reduction in the absorption peak for this frequency would be an indication that the peak has shifted.

A more positive method of identifying such a shift, would be to monitor at a slightly lower (or higher, as the case may be), more transparent frequency than for a normal bond. Should there be delamination, then there would be an increase in the absorbance peak at this selected lower peak.

Finally, thickness variations are also detectable by infrared inspection. The most satisfactory way of using the spectograph for such inspection is to select a wave length which is relatively translucent for the material, such as 6.5 microns in FIG. 1. For a carefully controlled thickness of material, it is important to first determine the amount of infrared energy that is absorbed from a known source or quantity of illuminating energy. Next, the material to be inspected is inspected with the same source or quantity. Should there be a reduction in the amount of energy absorbed by the inspected material from that which was absorbed by the material of controlled thickness, the inspected material is substantially thin. (Of course, the corollary that an increase in energy absorption is an indication of a thicker than normal material is also true, but this is normally of only secondary importance.)

Since the spectograph for each coating material is different from the spectograph for every other coating material and since monolithic anamolies have varying effects on specrographs, in applying the inspection principles discussed above, it is first desirable to develop the spectrograph for a properly cured and properly bonded material to be inspected and then develop spectrographs for the same material having therein the types of anomalies for which inspection is to be performed. Following the guidelines set out, it is then possible to determine what characteristics of the anomaly spectrographs make it possible to best determine when there is an anomaly of a specific type. Things to look for are opaque frequencies, transparent frequencies, translucent frequencies and places on the spectrograph affected by one anomaly but not the other ones. Through such study it is then possible to select regions conveying desired information that give the greatest sensitivity that are least susceptible to ambiguities.

Apparatus universally suitable for operation in accordance with the various inspection methods discussed above is shown in FIGS. 8 and 9. This particular apparatus is adapted for use in connection with pipeline inspection, although it will become apparent that conventional physical differences may be made to make any particular apparatus suited for its particular inspection environment.

FIG. 8 shows an inspection unit 11 suitably adapated for passing through a pipeline 13 having an internal polymer coating 15 to be inspected. Any convenient means may be employed for transporting the unit through the pipeline (as shown in the drawing, from right to left) and for maintaining the unit centralized, for example, the structure shown in patent application Ser. No. 115,243, filed June 6, 1961, and assigned to the same assignee as the present application, may be used. Generally, unit 11 comprises a rotating pickup head section 17 and a detector and amplifier section 19.

A radiating source 21, such as an infrared diode, included in the pickup head directs its illuminating energy through lens 23 to an area on the surface of coating 15. The casing walls of unit 11 adjacent to where energy is transmitted and received is suitably transparent or open to permit such passage. The energy source level suggested may be controlled so that the amount of illuminating energy is a known quantity. Also, ordinarily, the illuminating energy is at a uniform amplitude over the complete range of infrared frequencies of interest.

Coating 15 is penetrated to a depth depending on the energy level of the illuminating source, the opaqueness of the coating and the thickness of the coating. Unless the material is completely opaque for a given frequency band for the source energy level and the coating thickness, some percentage of the energy completely penetrates the coating to the substrate and is then reflected back through the coating. Normally, to give the most informative results, the energy source level is selected considering the thickness of the material so that for even the most opaque frequencies there is some substrate reflection.

Receiving lens 25, also located within head section 17, is positioned to receive the infrared energy emanating or irradiating from the substrate underneath the illuminated area of the coating material 15 and focuses the received energy onto a mirror 27. This mirror, in turn, is positioned at such an angle to project the received infrared energy to the remainder of the optical receiving system.

Located in detector and amplifier section 19 may be a dual-angle mirror or a conical prism means 29 for separating the received beam into two channels. The directing surface or surfaces may then guide a resulting beam channel successively off the surface of a directing mirror 31, a focusing filter lens 33, and a filtering means 35. Such filtering means may be effetcively tuned to a narrow band or region of frequencies of interest in accordance with the previously described methods.

Alternately, the lens 33 may include a filtering means as an integral part thereof so as to simultaneously accomplish the desired filtering as well as the desired focusing. Ultimately, however, the filtered channel beam is focused onto a detector or converter means 37, which may be a sensor thermistor. At this point the infrared energy is converted to electrical energy.

The output from converter 37 is amplified by readout amplifier 39 connected thereto, the output of which may then be supplied to a voltage comparator circuit and logic circuit 41.

It should be noted that the second beam developed from beam separator or splitter 29 is similarly processed successively by mirror 43, lens 45, filter 47, converter 49 and amplifier 51. Filtering in this second channel will most likely be at a different frequency from the filtering performed in the first channel, as determined by the specific method of operation chosen. The output from amplifier 51 in this second channel is also supplied to circuit 41. There may be three outputs from circuit 41, namely, an output showing the energy level from the beam signal in the first channel, an output showing the energy level from the signal in the second channel and a voltage comparison or difference output of the two channels (effectively indicating the ratio of the amplitude of the channel signals). These three outputs are brought out on lines 91, 92 and 93.

Of course, rather than indicating the absolute signal values for the two channels, it may be preferable to indicate a deviation value from a normal value. One method of accomplishing this is through a logic gating arrangement wherein one enabling signal is set or biased at the normal value.

The signals from the comparator circuit may then be amplified in amplifiers 94, 95 and 96, respectively, and supplied to an indicating or recording means 55 within or without inspection unit 11.

The monolithic anomaly inspection unit just described may be combined with flaw or holiday detectors, if desired. For example, electronic sensor pairs 57 detecting discontinuities in internal pipe coating 15 in accordance with Price et al. 2,978,637 may be used. The signal from these sensors may be conventionally amplified by amplifier 59 and applied to indicating or recording means 55 along with the other produced signals.

In a practical arrangement of handling the inspection information energy, a package such as shown in FIG. 9 may be used, as illustrated, the front of the package being to the left of the drawing.

An electronic and motor unit 61 supplies the required power for operating a wide band infrared energy source, such as diode 63. In addition, unit 61 also provides a motor for driving the rotating shaft 65 at a speed of about one revolution per second. Fixedly secured to this shaft is shield 67 having extension walls enclosing the radiating surface of diode 63 located opposite coating 15 to be inspected.

One or more slits 69 are located in shield 67 to permit the energy from diode 63 to illuminate coating 15, thereby producing "hot" and "cold" spots thereon. This scheme produces pulses that may be conveniently processed by the succeeding optical and electronic components of the inspection unit.

The received reflections from the substrate underneath the coating also pass through openings in shield 67 prior to being received by the optical system (including prism 71). Notice that a shield portion 73, which may be attached to shield 67, prevents radiations from diode 63 from being applied directly to prism 71.

A rotating, relatively high-speed disc 75 driven by motor 77 is positioned to receive the reflected radiation beam from prism 71. The disc may include multiple slots 79. The speed of the disc and the number of slots 79 achieve chopping of the signal so that electronic processing thereof may be by alternating current circuits. For instance, to obtain a 1,000 cycle per second signal, the disc may contain 100 slots and rotate at 600 revolutions per minute (10 revolutions per second). It should be noted that any convenient speed, slot number and obtained signal frequency may be used. Also, there is no need to synchronize the disc rotation with that of the rotating shield.

A filter (not shown) may be included for passing only that portion of the sensed beam in the desired monitored region of the received spectrum. Sensor 81 may include a parabolic reflector 83 for focusing the received beam to sensing element 85, located in the center thereof.

The resulting electronic signal is processed in electronic filtering, detection and indicating means 87. If no optical filtering is accomplished prior to sensing, means 87 may include electronic filtering circuits for isolating the frequency region (or regions) of interest. Otherwise, operation is identical to that described for the apparatus shown in FIG. 8.

With the movement of the search unit through the pipe and with the rotating movement of the head section (or shield), a helical search pattern is described. Depending on the relative speed of each type of movement, the entire internal coated area may be searched.

While several embodiments of the invention have been described, it is obvious that various substitutes or modifications of structure may be made without departing from the scope of the invention. For instance, any optical receiving system accomplishing the same function as that described for the illustrated systems, may be employed. Accordingly, the foregoing description is to be construed as illustrative only and not as a limitation upon the invention.

What is claimed it:

1. An apparatus for inspecting coating applied to a substrate for proper curing and delamination, comprising
 a radiating source directed to illuminate an area of the coating surface with infrared energy at a predetermined level in a band of frequencies that includes frequencies for which the coating is opaque when properly cured,
 an optical detection means positioned for receiving the infrared energy reflected from the substrate under the illuminated area, said optical detection means including beam splitter means for directing the infrared energy into a first and second channel,
 first filtering means in said first channel for passing said frequencies for which the coating is opaque when properly cured,
 first converter means for changing the infrared reflected energy from said first filtering means to corresponding first electrical signals,
 first comparator logic means for evaluating the level of the first electrical signals against a standard, a deviation in the form of an appreciable gain in reflected energy from that which is reflected from the substrate under a properly cured coated area indicating either improper curing or delamination,
 second filtering means in said second channel for passing frequencies in a band of frequencies which are lower than said frequencies for which the properly cured coating is opaque,
 second converter means for changing the infrared reflected energy from said second filtering means to corresponding second electrical signals,
 second comparator logic means for evaluating the level of the second electrical signals against a standard, a deviation in the form of an appreciable loss in reflected energy from that which is reflected from the substrate under a properly coated area indicating delamination.

2. An apparatus in accordance with claim 1, wherein said second filtering means is tuned for a region of frequencies that is particularly responsive to a delaminated coating.

3. An apparatus in accordance with claim 1, wherein said second filtering means is tuned for a region of frequencies that is particularly responsive to an improperly cured coating.

4. An apparatus for inspecting coating applied to a substrate for proper curing and delamination, comprising
 a radiating source directed to illuminate an area of the coating surface with infrared energy at a predetermined level in a band of frequencies that includes frequencies for which the coating is opaque when properly cured,
 an optical detection means positioned for receiving the infrared energy reflected from the substrate under the illuminated area,
  said optical detection means including beam splitter means for directing the infrared reflected energy into a first and a second channel,
 first filtering means in said first channel for passing said frequencies for which the coating is opaque when properly cured,
 first converter means for changing the infrared reflcted energy from said first filtering means to corresponding first electrical signals,
 first comparator logic means for evaluating the level of the first electrical signals against a standard, a deviation in the form of an appreciable gain in reflected energy from that which is reflected from the substrate under a properly cured coated area indicating either improper curing or delamination,
 second filtering means in said second channel for passing frequencies in a band of frequencies which are higher than said frequencies for which the properly cured coating is opaque,
 second converter means for changing the infrared reflected energy from said second filtering means to corresponding second electrical signals,
 second comparator logic means for evaluating the level of the second electrical signals against a standard, a deviation in the form of an appreciable gain in reflected energy from that which is reflected from the substrate under a properly coated area indicating delamination.

5. An apparatus in accordance with claim 3, wherein said second filtering means is tuned for frequencies that emanate from a delaminated coating.

6. An apparatus in accordance with claim 3, wherein said second filtering means is tuned for frequencies that emanate from an improperly cured coating.

7. An apparatus for inspecting coating applied to a substrate, comprising
 a radiating source directed to illuminate an area of the coating surface with infrared energy at a predetermined level in a band of frequencies that includes frequencies for which the coating is opaque when properly cured.
 an optical detection means positioned for receiving the infrared energy reflected from the substrate under the illuminated area,
  said optical detection means including beam splitter means for directing the infrared reflected energy into a first and a second channel,
 first filtering means in said first channel for passing said frequencies for which the coating is opaque when properly cured,
 first converter means for changing the infrared reflected energy from said first filtering means to corresponding first electrical signals,
 second filtering means in said second channel for passing frequencies in a band of frequencies which are different from the frequencies for which the properly cured coating is opaque,
 second converter means for changing the infrared reflected energy from said second filtering means to corresponding second electrical signals,
 comparator logic means for comparing the electrical level of the first electrical signals produced from said first converter means and the level of the second electrical signals produced from said second converter means and producing an output indicative of the ratio therebetween.

8. An apparatus for inspecting coating applied to a substrate, comprising
 a radiating source directed to illuminate an area of the coating surface with infrared energy over a wide band of frequencies and at a predetermined level,
 an optical detection means positioned for receiving the infrared reflected energy from the substrate under the illuminated area,
  said optical detection means including beam splitter means for directing the infrared reflected energy into a first and a second channel,
 first filtering means in said first channel for passing frequencies in a band of frequencies for which the coating is opaque when properly cured,
 first converter means for changing the infrared reflected energy from said first filtering means to corresponding first electrical signals,
 second filtering means in said second channel for passing frequencies in a band different from the band which is passed by said first filtering means,
 second converter means for changing the infrared reflected energy from said second filtering means to corresponding second electrical signals, comparator logic means for comparing the electrical signal level produced from said first converter means and the electrical signal level produced from said second converter means and producing an output indicative of the ratio therebetween.

9. An apparatus for inspecting coating applied to a substrate comprising a radiating source directed to illuminate an area of the coating surface with infrared energy over a wide band of frequencies and at a predetermined level, an optical detection means for receiving the infrared energy reflected from the substrate under the illuminated area, said optical detection means including beam splitter means for directing the infrared reflected energy into a first and a second channel, first filtering means in said first channel for passing frequencies in a first band of frequencies the reflected energy level for which is increased when the coating is improperly cured, first converter means for changing the infrared reflected energy from said first filtering means to corresponding electrical signals, first signal level detection means for measuring the signal level from said first converter means, a signal level higher than that produced by energy which is reflected from the substrate under a properly cured surface indicating improper curing, second filtering means in said second channel for passing frequencies in a second band of frequencies the reflected energy level for which is increased when the coating is delaminated, second converter means for changing the infrared reflected energy from said second filtering means to corresponding electrical signals, second signal level detection means for measuring the signal level from said second converter means, a signal level higher than that produced by energy which is reflected from a properly bonded surface indicating delamination of the coating.

10. An apparatus for inspecting coating applied to a substrate comprising a radiating source directed to illuminate an area of the coating surface with infrared energy over a wide band of frequencies and at a predetermined level, an optical detection means for receiving the infrared energy reflected from the substrate under the illuminated area, converter means for changing the infrared energy from said optical detection means to corresponding electrical signals, first electrical filtering means connected to said converter means for passing frequencies in a band the reflected energy level for which is increased when the coating is improperly cured, first signal detection means for measuring the signal level higher than that produced by energy which is reflected from a properly cured surface indicating improper curing, second electrical filtering means connected to said converter means for passing frequencies in a band the reflected energy level for which is increased when the coating is delaminated, second signal detection means for measuring the signal level from said second filtering means, a signal level higher than that produced by energy which is reflected from a properly bonded surface indicating delamination.

11. An apparatus for inspecting coating applied to a substrate, comprising a radiating source directed to illuminate an area of the coating surface with infrared energy at a predetermined level in a wide band of frequencies, an optical detection means positioned for receiving the infrared energy reflected from the substrate under the illuminated area, said optical detection means including beam splitter means for directing the infrared reflected energy into a first and a second channel, first filtering means in said first channel, for passing a first band of frequencies sensitive to change by a monolithic anomaly in the coating, first converter means for changing the infrared reflected energy from said first filtering means to electrical signals, second filtering means in said second channel for passing a second band of frequencies also sensitive to change by the same type of monolithic anomaly in the coating, but to a different degree, second converter means for changing the infrared reflected energy from said second filtering means to electrical signals, comparator logic means for comparing the electrical signal level produced from said first converter means and the electrical signal level produced from said second converter means and producing an output indicative of the ratio therebetween.

12. An apparatus in accordance with claim 11, wherein said first and second converter means includes chopper means to cause said resulting electrical signals to become alterating current electrical signals.

13. An apparatus for inspecting coating applied to a substrate, comprising a radiating source directed to illuminate an area of the coating surface with infrared energy at a predetermined level in a wide band of frequencies, an optical detection means positioned for receiving the infrared energy reflected from the substrate under the illuminated area, converter means for changing the infrared reflected energy from said optical detection means to electrical signals.

first electronic filtering means in a first channel that is coupled to said converter means for passing a first band of frequencies sensitive to change by a monolithic anomaly in the coating, second electronic filtering means in a second channel that is coupled to said converter means for passing a second band of frequencies also sensitive to change by the same type of monolithic anomaly in the coating, but to a different degree, comparator logic means for comparing the levels of the electrical signals received from said first and second filtering means and producing an output indicative of the ratio therebetween.

14. An apparatus in accordance with claim 13, wherein said converter means includes chopper means to cause said resulting electrical signals to become alternating current electrical signals.

References Cited

UNITED STATES PATENTS

| 2,547,212 | 4/1951 | Jamison et al. | 250—83.3 |
| 2,909,924 | 10/1959 | Flook et al. | 73—355 |
| 3,084,253 | 4/1963 | McHenry et al. | |
| 3,245,261 | 4/1966 | Buteux et al. | 73—355 |

RALPH G. NILSON, *Primary Examiner.*

S. ELBAUM, *Assistant Examiner.*

U.S. Cl. X.R.

117—17; 73—355